United States Patent
Dausend et al.

(10) Patent No.: US 8,275,580 B2
(45) Date of Patent: Sep. 25, 2012

(54) METHOD AND AUTOMATION CONTROLLER FOR THE OUTPUT OF A MAINTENANCE INFORMATION ITEM FROM AN AUTOMATION COMPONENT

(75) Inventors: Stefan Dausend, Schwabach (DE);
Dieter Helmig, Nürnberg (DE);
Christoph Plattner, Nürnberg (DE);
Josef Schindler, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 437 days.

(21) Appl. No.: 12/548,591

(22) Filed: Aug. 27, 2009

(65) Prior Publication Data
US 2010/0057402 A1   Mar. 4, 2010

(30) Foreign Application Priority Data
Aug. 28, 2008 (EP) ..................... 08015238

(51) Int. Cl.
*G06F 11/30* (2006.01)

(52) U.S. Cl. ..................... 702/184

(58) Field of Classification Search ............ 702/184
See application file for complete search history.

(56) References Cited

U.S. PATENT DOCUMENTS

| | | | |
|---|---|---|---|
| 6,708,074 B1 * | 3/2004 | Chi et al. .................. | 700/121 |
| 2002/0038200 A1 | 3/2002 | Chen | |
| 2005/0007249 A1 | 1/2005 | Eryurek | |
| 2007/0101178 A1 * | 5/2007 | Jammu et al. ............. | 714/4 |
| 2008/0125884 A1 | 5/2008 | Eryurek | |

FOREIGN PATENT DOCUMENTS

| | | |
|---|---|---|
| CN | 1346078 A | 4/2002 |
| EP | 1164550 A2 | 12/2001 |

OTHER PUBLICATIONS

Siemens Human-Machine-Interface Configuration (Touch Screen) and Application Technology, Changchu Liao, Oct. 31, 2006); Book; 2006.

* cited by examiner

*Primary Examiner* — Cindy H Khuu

(57) ABSTRACT

A method for an output of maintenance information of an automation component in an automation arrangement is provided. The automation arrangement includes the automation component, an automation controller and a local control unit which is functionally associated with the automation component. In a first step status information relating to the automation component is formed in the automation controller, in a second step the status information is used by the automation controller to generate or change the maintenance information, and in a third step the maintenance information is transmitted from the automation controller to the control unit and is output there.

11 Claims, 1 Drawing Sheet

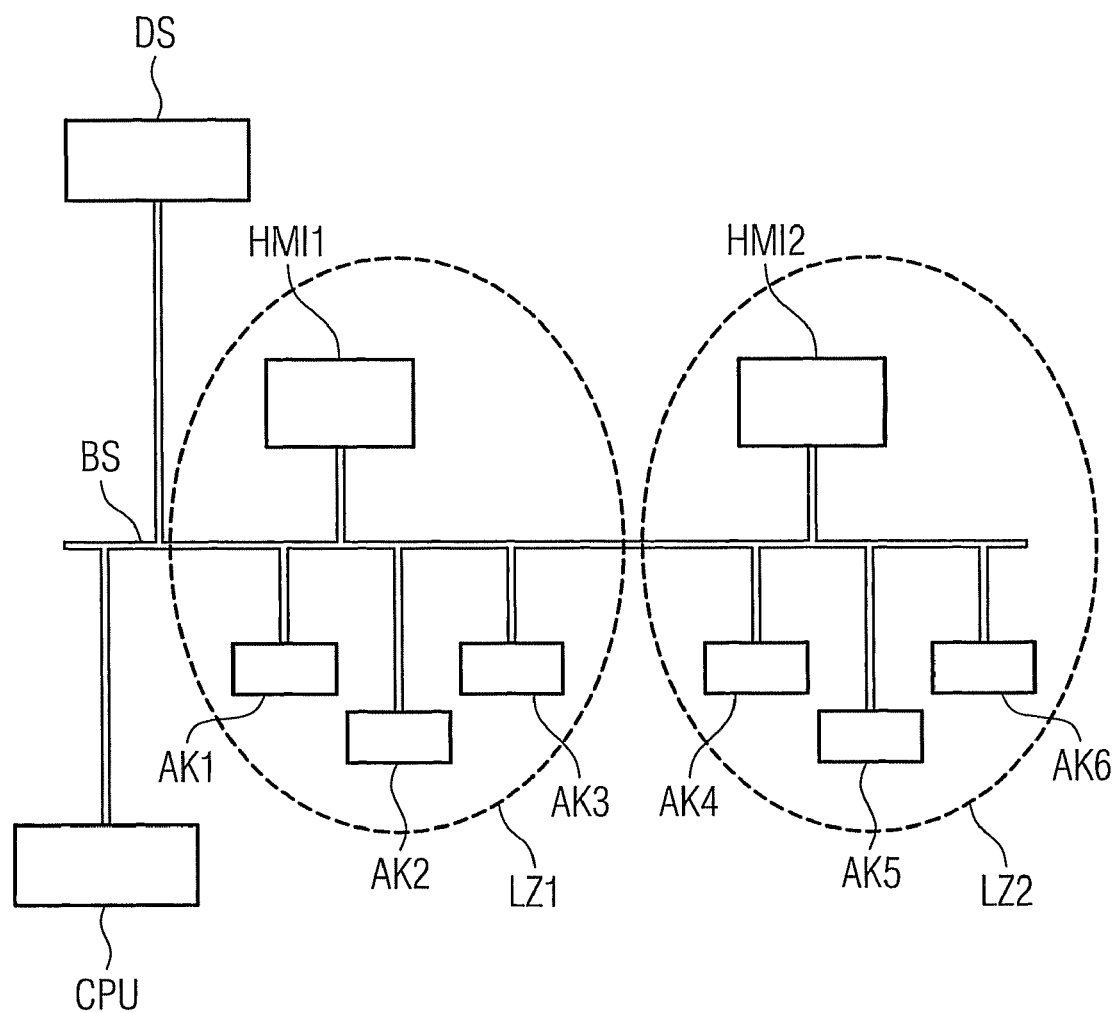

METHOD AND AUTOMATION CONTROLLER FOR THE OUTPUT OF A MAINTENANCE INFORMATION ITEM FROM AN AUTOMATION COMPONENT

CROSS REFERENCE TO RELATED APPLICATIONS

This application claims priority of European Patent Office Application No. 08015238.2 EP filed Aug. 28, 2008, which is incorporated by reference herein in its entirety.

FIELD OF INVENTION

The invention relates to a method for the output of a maintenance information item from an automation component and to an automation controller for the output of a maintenance information item.

BACKGROUND OF INVENTION

Automation systems for automated production facilities and other applications have a multiplicity of sensors and actuators, these frequently being referred to in summary by the term "automation components". The automation components are connected to one or more central devices, which are often referred to as "automation controllers" or else as "CPUs" for short. In this case, the connection is usually made by means of what is known as a bus system, that is to say by means of a data line to which a multiplicity of automation components and automation controllers can be connected. An automation controller usually has the task of controlling the automation components. This means that an automation controller receives and processes measured values and state information from the sensors, and in return generates commands (control information) for the actuators and transmits them to these. In addition, an automation controller can also receive and process status information from the automation components, said status information providing information about the state of the respective automation component itself, for example about faults, operating state, etc.

Other parts of customary automation systems are control units, often also referred to as "HMI" (human-machine interface). The control units are usually also operated on said data bus, and are used both for controlling the automation controllers and for controlling the automation components. Frequently, however, the automation components cannot be controlled directly, which means that in such cases (and in the case of many arrangements in principle) the data interchange takes place between the control unit and that automation controller with which the relevant automation component is associated. In complex, widely ramified automation systems, a plurality of control units and often also a plurality of automation controllers are usually used, with automation components being associated with control units usually such that a user of a control unit has visual contact with an automation component which is to be controlled; this applies particularly for actuators which can be used to move machines or tools, and also for other "safety-relevant" fields of use.

In the event of a fault, the display devices of control units can also be used to show status information for the relevant (faulty) automation components. Said information is ideally retrieved directly from the relevant automation component, but is often also retrieved from a system memory in the automation controller. It is therefore often a simple matter to identify the faulty automation component, because the associated control unit, as stated, is frequently in direct proximity to the respective automation component.

Whereas a status information item which is present in an automation component itself or in an associated automation controller often makes only a "binary" statement regarding whether this automation component is operational, or else not, it is frequently the intention to use suitable maintenance measures to prevent the "fault situation" from arising in the first place. An attempt is thus made to use status information and to use empirical values, for example an MTBF (Mean Time Between Failure) value, to identify automation components which, although currently (still) working satisfactorily, need to be maintained before long in order to ensure fault-free continued operation of the automation system. For this purpose, it is customary to transmit operating and status information relating to the automation components to a central maintenance component, which is also called a "diagnosis station" or "maintenance station" on a regular basis. Often, "maintenance stations" of this kind are products from manufacturers other than the manufacturer of the actual automation system, and are then also referred to as an "MES system" (Manufacturer Execution System). These are usually a central workstation computer, in which the operating and status information of many or all automation components is captured centrally and is respectively related to other data (for example the aforementioned MTBF values). This is used by the "maintenance station" to generate and output maintenance instructions, these usually being read and noted or printed and then "executed" by a service employee.

A drawback found with the stated method for creating and processing maintenance information is that the service employee needs to write down or print the centrally available information (maintenance instructions, technical data) and carry it with him, but has no access to the full data inventory of the "maintenance station" "in situ" at the automation component which is to be maintained. This is a drawback particularly with complex automation systems, because the arrangement of the individual automation components is frequently confusing, which means that it is already difficult to locate (find) an affected automation component in the first place. A further drawback is that the "information" available in the "maintenance station" is frequently too complex to write down or print comprehensively.

To overcome the stated drawbacks, various approaches are already known, for example producing the "maintenance station" as a mobile appliance (for example as a laptop computer or PDA, etc.). However, this has the drawback—inter alia—that the service employee needs to carry a possibly sensitive and heavy appliance of this kind with him, which, particularly in a "harsh" industrial environment, can also entail further technical problems. Another way of avoiding the drawbacks is to operate a multiplicity of "maintenance stations" in a ramified automation arrangement, in the hope of one of these "maintenance stations" being near to an automation component which is to be maintained. This solution naturally entails increased complexity for hardware and software.

SUMMARY OF INVENTION

It is thus an object of the present invention to simplify the finding of automation components which are to be maintained and to make the required maintenance information accessible in the local surroundings of the automation components.

The object is achieved by the method and by the automation controller according to the independent claims.

In this case, the object is achieved by providing a method for the output of a maintenance information item from an automation component in an automation arrangement, wherein the automation arrangement comprises at least the automation component, an automation controller and a local control unit which is functionally associated with the automation component. In this case, the automation controller first of all forms or captures a status information item relating to the automation component. The status information item is then used by the automation controller to generate or change the maintenance information item, after which the maintenance information item is transmitted from the automation controller to the control unit and is output (displayed) there. This method allows use of the control units, which are already available locally (usually in the visual range) to the automation components anyway, to access the maintenance information items, as a result of which a service employee can easily identify, find and control an automation component which is to be maintained. Furthermore, it is thus possible to automatically output advice of automation components which need to be maintained to the control units, so that finding such automation components is simplified.

The object is also achieved by an automation controller for the output of a maintenance information item from an automation component in an automation arrangement having at least one control unit, wherein the automation controller is set up to capture at least one status information item from the at least one automation component, and wherein the automation controller is used for generating or changing a maintenance information item relating to the at least one automation component, the automation controller also being set up to transmit the maintenance information item to the at least one control unit. The use of an automation controller of this kind allows a control unit to be supplied with the information required for a maintenance job. Requisite control inputs from the service employee on the control unit in situ with visual contact with the machine are immediately possible.

Advantageous refinements of the method and the automation controller are specified in the dependent claims. The features and advantages specified in the dependent patent claims relating to the method can also be applied, mutatis mutandis, to the automation controller according to the invention, and vice versa.

The software (firmware) of the control units needs to be set up for processing (display, output) of the maintenance information items. This is facilitated if, in the case of an automation arrangement which comprises a plurality of automation components with a plurality of maintenance information items, as many maintenance information items as possible from the automation components are stored and processed in a standard data format and are transmitted with such conditioning to the control unit or control units.

Since control units often have only restricted user interfaces and further equipment features, it may frequently be advantageous if the maintenance information item or maintenance information items is (are) transmitted from the automation controller or automation controllers to a (or a plurality of) diagnosis station(s). This retains the advantage of a central workstation for accessing maintenance information items, but there also being a continued advantage of the local availability of the maintenance information items. When at least one "central" diagnosis station ("maintenance station", "MES system") is used, additional maintenance information items relating to the automation component can be transmitted from such a diagnosis station to the automation controller, the automation controller taking account of these additional maintenance information items when generating or changing the maintenance information item which is to be transmitted to the control unit. By way of example, this also relates to comparison values in the sense of MTBF values or what are known as "threshold values", which, when reached or exceeded, configure a maintenance event.

Many automation components are of technically comparatively simple design, which means that they can often transmit only restricted "cryptic" status information items to the automation controller. It is therefore useful to hold a data record having an electronic appliance description for the respective automation component in the automation controller, with status information and other information about the relevant automation component being able to be conditioned (translated) on the basis of this appliance description and thereby stored in a standard data format. In this case, appliance descriptions in known data formats, such as the GSDML format or the EDD format, can also be used to particular advantage across manufacturers.

Advantageously, an automation controller is equipped with a data interface to an MES system (Manufacturer Execution System), wherein the automation controller converts the status information item and the maintenance information item into a data format which is specific to the relevant MES system and transmits them to this MES system. The algorithms held in the customary MES systems for the purpose of generating and changing maintenance information items can thus be supplied with data. There is then a particular advantage in a subsequent converse data transfer, with the maintenance information item(s) generated by means of an MES system being able to be sent to the automation controller, stored there and finally made accessible to the control units.

In many application scenarios, one and the same automation controller has not only a multiplicity of automation components connected to it or logically "registered", but also a plurality of control units. In this case, it is useful if the automation controller contains as explicit as possible an association between automation components and control units, so that ideally the maintenance information item from an automation component is transmitted or made accessible to the control unit which is closest to this automation component.

BRIEF DESCRIPTION OF THE DRAWINGS

Exemplary embodiments of a method according to the invention are explained below with reference to the FIGURE. At the same time, they serve to explain an exemplary embodiment of an automation controller according to the invention.

In this case, the single FIGURE shows an arrangement comprising an automation controller, a plurality of automation components, a plurality of control units and a diagnosis station.

DETAILED DESCRIPTION OF INVENTION

The FIGURE schematically shows selections from an automation arrangement having a data bus BS ("bus system") to which the automation components AK1, . . . , AK6, the control units HMI1, HMI2 ("Human Machine Interface"), the automation controller CPU (Central Processing Unit) and the diagnosis station DS are connected in groups comprising two local zones LZ1, LZ2. All further appliances, components and devices which are important for the operation of an automation system or of an automation arrangement and which are not addressed directly in the description of the present exemplary embodiment have not been shown in the FIGURE for reasons of clarity.

In the text which follows, the FIGURE will be used to describe the generation and output of a maintenance information item for the automation component AK1; in this case, the automation component AK1 considered by way of example is a temperature sensor for a production installation. This temperature sensor is of two-channel design inside in this instance for reasons of redundancy, with failure of the first channel (main channel) automatically involving changeover to the second channel (auxiliary channel) and additionally the production of an appropriate status information item which can be read via the data bus BS. This status information item comprises the setting of a bit reserved for this purpose in the temperature measured values which are read by the automation controller CPU at regular intervals of time from the automation component AK1 (temperature sensor). With regard to the temperature sensor (temperature probe), it is also known that it is subject to temperature-dependent wear, the manufacturer of the temperature sensor recommending replacement after an operating period of 10 000 hours at temperatures above 500° C.; this value is subsequently used as the MTBF or threshold value for deciding about the output of a maintenance information item.

The appliance description (appliance information) in a standardized description language (e.g. GSDML) means that all the necessary diagnosis information is available for the engineering of the automation components. The appliance information also contains the information described above, for example an operating limit of 10 000 hours at temperatures greater than 500° C. as an MTBF value, in encoded form, and also an instruction to the effect that, in situations in which the temperature sensor has been changed over to the second channel, replacement of this component will likewise be proposed.

In the course of operation of the automation component AK1, the present exemplary embodiment thus involves two different status information items being held in the automation controller CPU, namely on the one hand the status relating to the activation of the "auxiliary channel", which is produced by the relevant automation component AK1 itself, and on the other hand an externally formed status, namely the operating period of the automation component AK1 at relatively high temperatures. This latter status information item is produced by the automation controller CPU itself by reading a temperature measured value from the automation component AK1 at regular intervals of time, and whenever the temperature measured value read reaches or exceeds 500° C. an operating hours counter associated with this temperature probe is incremented by an appropriate unit of time. In this way, a statistical value around the previous operation of the automation component AK1 is obtained.

As soon as one of the two stated status information items meets the respective condition for triggering the maintenance event (in this case: replacement of the temperature probe), the automation controller CPU produces an appropriate maintenance information item, which in the present case consists in a piece of advice or an advice message which recommends that the temperature probe be replaced and indicates the reason for this (fault in the main channel of the temperature probe, or operating limit exceeded). This message is transmitted to that control unit HMI1 which is appropriately associated with the automation controller CPU of the automation component AK1. In addition, the maintenance information item (message) is transmitted to the diagnosis station DS by the automation controller CPU and is also displayed on said diagnosis station. As an alternative to the firm association between one or more control units HMI1, HMI2 and the relevant automation controller CPU, the control units HMI1, HMI2 and the automation components AK1, . . . , AK6 may also have a respective associated local zone LZ1, LZ2 as location information, so that the output of the maintenance information item in the present exemplary embodiment is output to the control unit HMI1 having the same local zone LZ1 as is also associated with the relevant automation component AK1. A similar situation applies when a plurality of diagnosis stations DS are used.

Whereas two status information items are evaluated in the exemplary embodiment above, one of these status information items having been formed by the automation component AK1 itself and the second status information item having been calculated by the automation controller CPU using statistical data about the previous operation of the automation component AK1, namely operating period and operating temperature, other "data sources" for status information are alternatively also conceivable, for example "third" components in the form of wear sensors or the like. In addition, data interchange between the automation controller CPU and the diagnosis station DS or another MES system is also conceivable, this route also being able to be used to make maintenance instructions in the form of work schedules, materials lists, checklists, circuit diagrams, flowcharts, spares information, etc., available on the control unit HMI1.

In advantageous refinements, it is usually the case that the status information is transmitted from the automation components AK1, . . . , AK6 to the automation controller CPU using what is known as the "push method", the "push method" furthermore also mostly being used for transmitting the maintenance information item from the automation controller CPU to the control units HMI1, HMI2. Of course, it is also possible for all of this information to be retrieved selectively from the receiving components using the "pull method", however. Finally, the stated data sources for status information and comparison values (MTBF values, threshold values, etc.) also allow the use of combined methods and sources in order to arrive at optimized maintenance information. Particularly in the case of "precautionary" interchange or for preventive maintenance, it has been found that the average or probable life of components is dependent on a large number of factors, such as temperatures, switching processes, voltages, mechanical loads, etc. It is therefore advantageous to use as many of the stated and other variables as possible for generating maintenance information.

The invention claimed is:

1. A method for an output of maintenance information of an automation component in an automation arrangement having a plurality of automation components, comprising:
   providing in communication via a bus, a plurality of automation components, an automation controller and an interface control unit functionally associated with each of the automation components as either an explicit association or an association by zone to simplify location of each automation component;
   receiving by the automation controller from each automation component status information relating to the automation component;
   translating the status information from each automation component into a first status;
   generating a second status by the automation controller, wherein the second status is based on status information collected by the automation controller over time during operation of each automation component;
   generating or changing maintenance information of each automation component by the automation controller based upon either the first or second status information meeting a respective condition for triggering the maintenance information;
transmitting the maintenance information from the automation controller to the interface control unit; and
outputting the maintenance information by the interface control unit.

2. The method as claimed in claim 1, wherein the maintenance information of each of the automation components are processed in a standard data format.

3. The method as claimed in claim 1, wherein the second status information is generated by each automation component and is transmitted to the automation controller.

4. The method as claimed in claim 1, wherein the second status information is generated by each automation controller using statistical information about the previous use of the automation component.

5. The method as claimed in claim 1, wherein the second status information is generated by each automation controller using further status information which received from external data sources.

6. The method as claimed in claim 1, further comprising:
providing a diagnosis station; and
transmitting the maintenance information from the automation controller to the diagnosis station.

7. The method as claimed in claim 6, wherein the diagnosis station transmits additional maintenance information relating to the automation component to the automation controller, and wherein the automation controller takes account of the additional maintenance information when generating or changing the maintenance information to be transmitted to the control unit.

8. The method as claimed in claim 1, further comprising:
storing an appliance description for the automation component in the automation controller; and
converting the maintenance information to be transmitted into a data format defined by the appliance description prior to the transmission by the automation controller.

9. The method as claimed in claim 8, wherein GSDML data format or EDD data format is used for the appliance description.

10. The method as claimed in claim 1, further comprising:
providing an manufacturer execution system (MES), the automation controller being equipped with a data interface to the MES;
converting the maintenance information by the automation controller into a data format which is specific to the MES; and
transmitting the maintenance information to the MES.

11. An automation controller for use in an automation arrangement including an automation component and an interface control unit, wherein the automation controller is configured
to capture status information of the automation component, to translate the status information from the automation component into a first status;
to generate a second status based on status information captured by the automation controller over time during operation of the automation component;
to generate or change maintenance information relating to the automation component based upon either the first or second status meeting a respective condition for triggering the maintenance information, and
to transmit the maintenance information to the interface control unit for display,
wherein the automation controller is arranged in an automation arrangement including a plurality of automation components and a plurality of control units, each of the control units has an associated subset of the automation components, the automation controller stores association information about the association between the automation components and the control units as either an explicit association or an association by zone to simplify location of the automation component, and the automation controller is configured such that maintenance information associated with the respective automation components are transmitted only to the control unit associated with the relevant automation component.

* * * * *